United States Patent

Ensign

[15] 3,680,606

[45] Aug. 1, 1972

[54] STATIC-REDUCING AND VAPOR-REDUCING LOADING VALVE FOR TANK TRUCKS

[72] Inventor: Harold W. Ensign, Fullerton, Calif.

[73] Assignee: Cla-Val Co., Costa Mesa, Calif.

[22] Filed: Feb. 17, 1969

[21] Appl. No.: 799,567

[52] U.S. Cl. ................. 141/128, 137/386, 141/286, 141/374, 141/392
[51] Int. Cl. ............................................. B65b 3/26
[58] Field of Search ...... 137/386, 389, 390; 141/128, 141/286, 374, 392, 311; 138/37-46

[56] References Cited

UNITED STATES PATENTS 3,138,170    6/1964    Schaetzly ..................... 137/386

*Primary Examiner*—Houston S. Bell, Jr.
*Attorney*—Gausewitz & Carr

[57] ABSTRACT

A loading valve mounted at the end of the fill pipe for a tank truck, tank car, etc., and which is adapted automatically to shift from a low-flow condition to a high-flow condition when the liquid in the tank reaches a predetermined level. Such level is adequate to insure continued immersion of the valve outlet, so that a high rate of flow may occur without resulting in splashing and consequent generation of static charges and/or smog-forming vapors. An enclosed control chamber is provided, and communicates through a ballast (or reservoir) chamber and a control port with the exterior of the valve at a predetermined elevation. Gasoline or other volatile fluid from the valve inlet is passed, in the form of a jet, from a power nozzle through the control chamber and thence to a receiver, the receiver being adapted to create sufficient static pressure that the loading valve is maintained in a low-flow condition so long as the control chamber contains air as distinguished from liquid. As soon as the liquid level in the tank rises to the elevation of the control port, the control chamber fills with liquid and thus operates to shift the loading valve to a high-flow condition. Prior to the time the control chamber fills with liquid, the jet aspirates air into the control chamber, such air sweeping generated vapors downwardly to the tank bottom at an elevation below the surface of the liquid in the tank. Means are provided to retard the rate of valve shifting from a low-flow to a high-flow condition, and thus prevent surges in the line leading to the control valve, but to permit rapid shifting from a high-flow to a low-flow condition during initial positions of the tank-filling operation. Deflector means are provided to retard the initial inflow and to insure that liquid flowing through the valve enters the tank smoothly and in a generally horizontal direction.

23 Claims, 4 Drawing Figures

PATENTED AUG 1 1972

INVENTOR.
HAROLD W. ENSIGN

BY *Jamsewiz & Carr*

ATTORNEYS.

STATIC-REDUCING AND VAPOR-REDUCING LOADING VALVE FOR TANK TRUCKS

BACKGROUND OF THE INVENTION

1. The Field of the Invention

This invention relates to the field of devices for minimizing generation of static electricity, and creation of smog-forming vapors, during loading of tanks, particularly the tanks of tank trucks, railway tank cars, etc.

2. Description of the Prior Art

The prior art conventionally comprises manual controls for shifting from low-flow to high-flow operation after the inlet from the fill line to the tank is immersed. Such manual shifting is unsatisfactory because it relies upon the operator to effect shifting at the desired time, and operators frequently cannot be relied upon to insure that the necessary valve control will be effected. For example, many operators have been found to effect the initial portions of tank-filling operations at an excessively rapid flow rate, with consequent splashing and creation of static electrical charges so that explosions sometimes occur. Furthermore, the excessive initial flow rate, whereby the liquid flows rapidly and splashes into a substantially empty truck, creates large amounts of vapor and mist of the volatile liquid. Thereafter, such vapors are pumped out of the truck and into the atmosphere as the result of the piston action effected by the upwardly-moving surface of the liquid. The result is that large amounts of vapor are expelled to the atmosphere during each tank-filling operation. Such raw vapors are a recognized factor in the creation of smog.

The only prior art of which applicant is aware and which makes use of a power nozzle and a receiver comprises a sensing device which is disposed at the upper portion of the interior of a tank truck, and which effects complete cessation of the filling operation when the liquid in the tank reaches a desired filled level. Such sensing device is connected to a fill valve through a long length of tubing, and causes operation of a pilot valve which, in turn, controls the fill valve. The sensing device is open to the atmosphere, and does not incorporate a passage or port through which air is aspirated as a result of operation of the power nozzle. Large amounts of vapor are created due to the mist-forming action occurring when the rapidly-moving jet from the power nozzle impinges against portions of the receiver, and such vapor is not trapped but instead passes directly into the tank.

In another prior-art construction, an eductor device is connected adjacent a valve, outside of the tank and in the supply apparatus for the fill line. The eductor is connected through tubing which extends a long distance to the bottom of the tank, the relationship being such that air is drawn into the tubing from the tank until the tank is filled to a desired level. As soon as the tubing commences to draw liquid instead of air, the resulting suction operates the valve and shifts the same from a low-flow condition to a high-flow condition. No flooding of any chamber between a nozzle or a receiver takes place, the long length of tubing instead creating a constricting or impeding action which causes valve operation in the absence of any flooding. Such long length of tubing is extremely undesirable either within or exterior to the fill line, particularly since the line necessarily incorporates various joints and/or valves. The long tubing is highly subject to clogging and other types of malfunction.

There exists a severe need for a self-contained loading valve which is highly rugged and durable, which needs no external sensors or lengths of tubing, which incorporates no diaphragms, pilot valves, etc., and which has only one major moving part, yet which operates effectively to assure shifting from a predetermined low-flow condition to a predetermined high-flow condition as soon as the liquid level in the tank arrives at a safe elevation. Such loading valve must be such that it does not itself generate static electricity or discharge vapors, but instead minimizes formation of both static and vapors. It should also be such that shifting to high-flow condition will occur safely but when the liquid level is relatively low, so that the tank may be filled in a minimum length of time. The valve should also be such that it will shift to the safe low-flow condition rapidly, but will not shift to the high-flow condition so rapidly that surges will be formed in the lines leading to the apparatus. In addition, and very importantly, the discharge from the flow control valve should be relatively low velocity and in a horizontal direction.

SUMMARY OF THE INVENTION

The self-contained loading valve of the present invention incorporates an enclosed control chamber connected through a ballast (reservoir) chamber and a control port to the ambient atmosphere at a level not achieved by the liquid in the tank until high-velocity flow may occur safely. A power nozzle and a receiver communicate with the control chamber, liquid being passed to the power nozzle from the loading valve inlet and jetting through the control chamber at high velocity to the receiver. The resulting pressure created in the receiver is transmitted to a power chamber and is sufficient to shift a movable valve element to a low-flow condition. Means are provided to cause aspirated air to sweep mist and vapor from the control chamber to the bottom of the tank. Means are provided to permit shifting of the movable valve element to low-flow condition to occur rapidly, but to cause shifting in the opposite direction to occur slowly. Deflector means are located downstream from the movable valve element to reduce greatly the velocity of flow when the valve is in the low-flow condition, and also to cause the reduced-velocity liquid to spread outwardly from the valve in a generally horizontal direction so that splashing is substantially prevented.

DESCRIPTION OF THE PREFERRED EMBODIMENT

Figure 1:
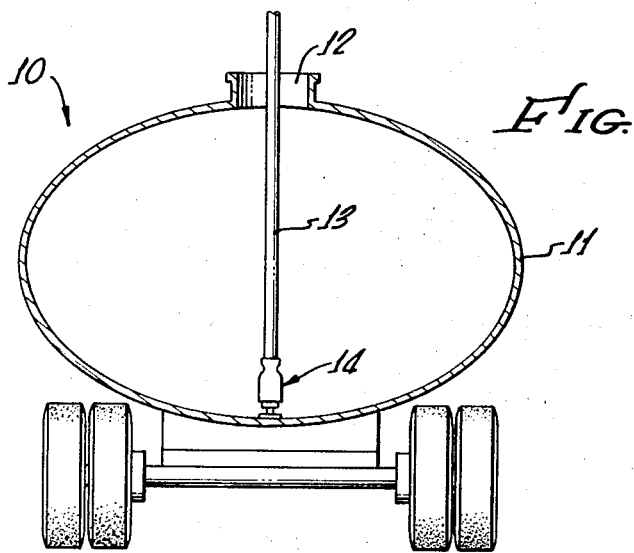
FIG. 1 is a schematic transverse sectional view illustrating a tank truck having a fill pipe inserted therein and with the present loading valve at the end of such pipe.

Referring first to FIG. 1, a tank truck 10 is illustrated schematically as incorporating a tank 11 having a fill opening 12 at the upper portion thereof. A fill pipe 13 extends vertically downwardly through fill opening 12 to the tank bottom and has mounted at the lower end thereof the loading valve 14 of the present invention, the arrangement being such that the lower end of the valve seats on the tank bottom. Fill pipe 13 is connected through suitable shutoff valving (not shown) to a source (not shown) of gasoline or other liquid.

Figure 3:
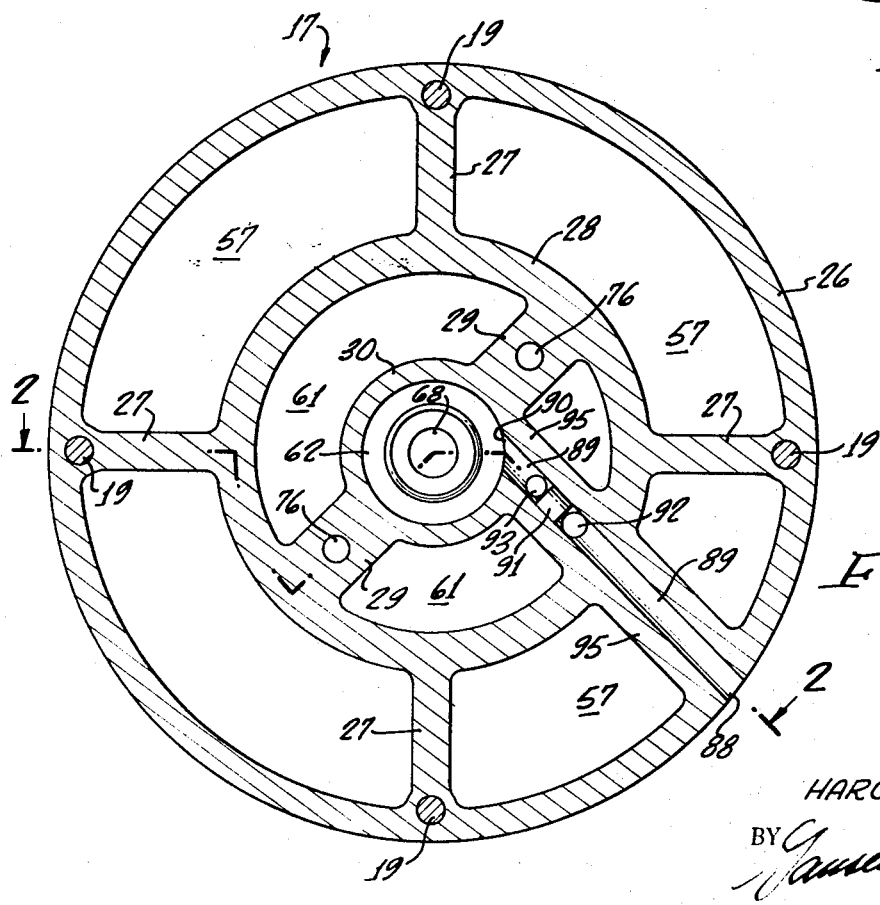
FIG. 3 is a horizontal sectional view on line 3—3 of FIG. 2.
Figure 2:
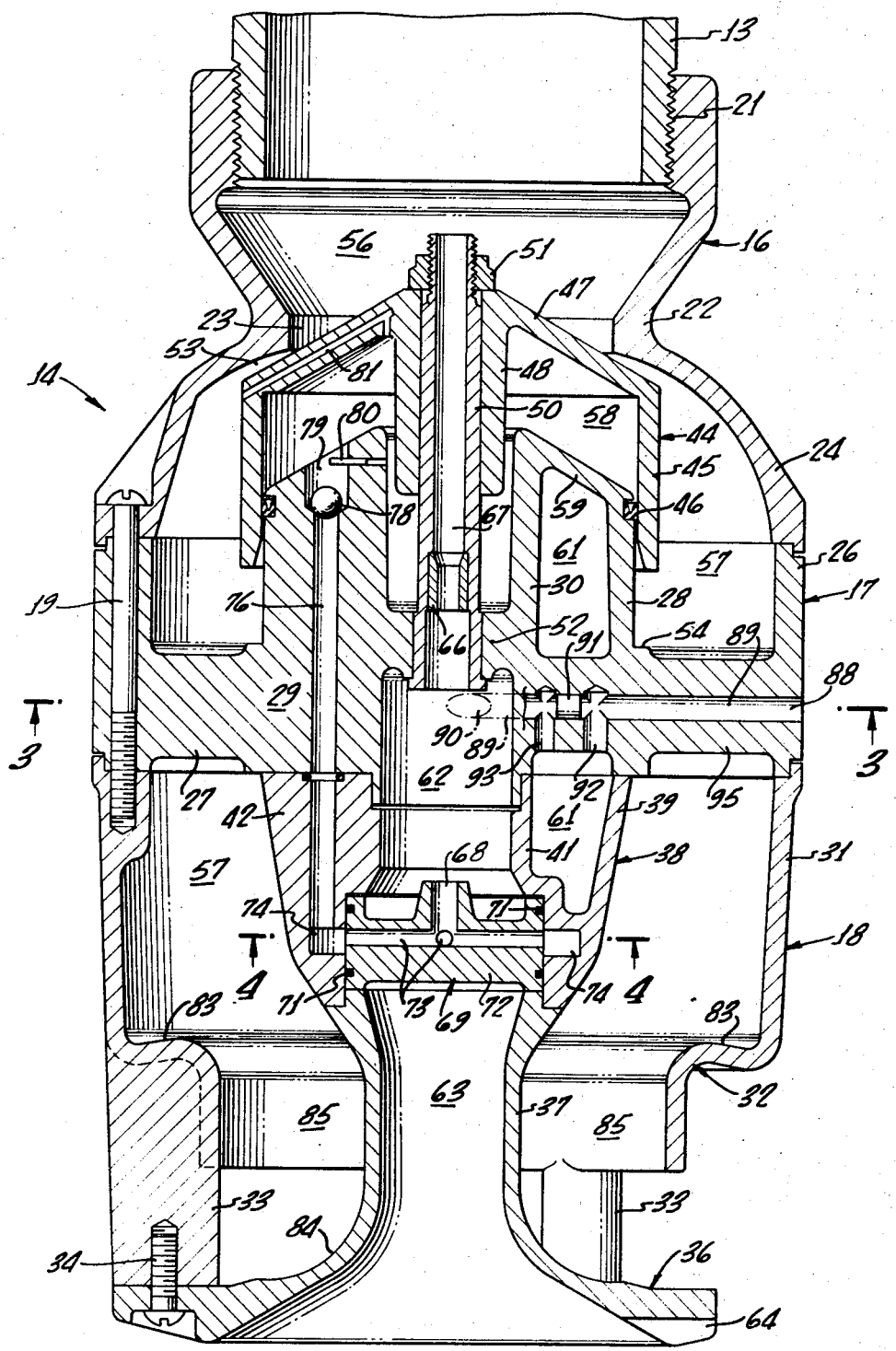
FIG. 2 is a longitudinal sectional view of the loading valve, the section being taken on the broken line indicated at 2—2 in FIG. 3.

Referring next to FIG. 2 in particular, the valve casing or body is illustrated to comprise upper, middle and lower sections 16–18, respectively, which are connected to each other by means of a plurality of circumferentially spaced screws 19 (FIGS. 2 and 3). The upper end of section 16 is connected coaxially, as by the threaded connection 21, to the lower end of fill pipe 13. The middle portion of upper section 16 is necked down at 22 and defines a flow port 23 which is circular in shape and coaxial with the longitudinal axis of the valve. At its region below the necked-down portion 22, upper casing section 16 flares outwardly at 24 and cooperates with remaining portions of the valve to define an annular outlet chamber indicated hereinafter.

The middle section 17 of the valve casing has a cylindrical outer wall 26 (FIGS. 2 and 3) which is connected through a plurality of circumferentially spaced radial webs 27 with a cylindrical intermediate wall 28. Intermediate wall 28, in turn, is connected through two radial webs 29 with a cylindrical central wall 30.

Lower section 18 of the casing has a cylindrical outer wall 31 which merges at its lower end with radially inwardly extending deflector means 32 described hereinafter. The lower portion of section 18 is open, and is integral with a plurality (for example, three) of circumferentially spaced legs or posts 33. Such legs are secured by screws 34 to the peripheral portion of an additional deflector means 36 adapted to seat on the bottom of tank 11 as shown in FIG. 1.

The additional deflector means 36 includes a hollow stem 37 which curves inwardly and upwardly coaxially through the first-mentioned deflector means 32. At its upper end, stem 37 is shaped to seat the lower portion of a wall means 38. Such wall means has an outer generally frustoconical wall 39 (FIGS. 2 and 4) the upper edge of which seats against the lower edge of the above-described cylindrical wall 28 and forms an extension thereof. Correspondingly, wall means 38 has an inner wall 41 which is cylindrical in shape and seats against the lower end of central wall 30 to form an extension thereof. The outer and inner walls 39 and 41 of wall means 38 are connected by radial webs 42 which are located correspondingly to the webs 29 shown in FIGS. 2 and 3, and which seat (as extensions) against the lower ends of such webs 29.

It is a major feature of the illustrated valve that it has only one moving part, other than the balls which form parts of ball-check valves to be described. Such moving part is a flow-control poppet 44 which is movably mounted in the valve casing beneath flow port 23 and operates automatically to change the flow rate from a low-flow condition to a high-flow condition. Poppet 44 has a cylindrical side wall 45 which telescopes slidable over the exterior cylindrical surface of wall 28, there being a packing ring 46 (for example, the illustrated chevron seal) therebetween to prevent excessive leakage of liquid from the interior of the poppet. At its upper end, side wall 45 merges with a frustoconical upper wall 47 which converges upwardly, and such wall 47 is in turn integral with a downwardly extending tubular sleeve 48 the outer diameter of which is less than the inner diameter of central wall 30.

A combination guide and conduit is provided in the form of a tubular stem 50 which extends slidably through sleeve 48, coaxially of the longitudinal axis of the valve, and is exteriorly threaded at its upper end to receive an adjustable stop nut 51. The stem 50 is press-fit or otherwise rigidly secured in a cylindrical opening through an annular shoulder portion 52 which is formed integrally with and within the wall 30.

Stop nut 51 is normally adjusted to a position such as that illustrated in FIG. 2, and which stops upward travel of poppet 44 prior to the time that the casing section 16 is engaged. Accordingly, there is always a circular flow passage 53 between the poppet and the necked-down portion 22 of the casing. When the poppet is in the illustrated upper position, or at any other desired upper position (determined by the setting of nut 51), the rate of flow of liquid through port 23 and downwardly into the tank 11 is small. The poppet subsequently moves downwardly to a lower or full-flow position at which the lower edge of wall 45 seats on a stop shoulder 54.

The region of the valve casing above flow port 23 may be termed the inlet chamber 56. Such chamber constantly communicates through the circular flow passage 53 (or through a much larger and corresponding flow passage which exists when the poppet 44 is in its lower or full-flow position) with an annulus or outlet chamber 57. The upper portion of such annulus 57 is defined between poppet side wall 45 and the flared portion 24 of casing section 16. The intermediate region of such annulus 57 is defined between cylindrical walls 26 and 28 of middle section 17. The lower portion of the annulus is defined between walls 31 and 39, the former wall being in lower section 18 and the latter wall being part of the wall means 38. The discharge from annulus or outlet chamber 57 is between the first and second deflector means 32 and 36.

A chamber 58 is defined generally between poppet wall 47 and an opposed stationary wall 59, the latter extending integrally between the upper ends of walls 28 and 30. Such chamber 58 may be termed the power chamber and is sealed by the packing ring 46 as previously indicated. It is emphasized that shoulder 52 extends around tubular stem 50 in close-fitting, sealed relationship, so that the only means of entrance and exit of liquid from the power chamber 58 is through the passage and check valve means described hereinafter.

The wall 59 also cooperates with walls 28 and 30, and also with walls 39 and 41, in defining an annular chamber 61 which may be termed the ballast or reservoir chamber, and performs an important time-delay function.

Defined below shoulder 52 and within the cooperating cylindrical walls 30 and 41 is a chamber 62 which may be termed the control chamber. Such chamber, having a cylindrical side wall (a surface of revolution about the axis of the valve), is in constant communication with a spillway or drain chamber 63 which is defined within stem 37. An outlet from the spillway 63 is provided at 64 in the form of a notch in the lower peripheral portion of the deflector means 36. Thus, there is always a means of communication between spillway 63 and the lowermost part of the interior of tank 11, even though the bottom wall of the tank may in some instances be flat.

Figure 4:
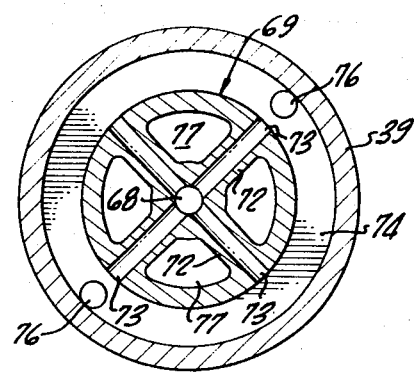
FIG. 4 is a horizontal sectional view on line 4—4 of FIG. 2.

The lower end of stem 50 is counterbored to receive a power nozzle 66. Thus, liquid under pressure flows from inlet chamber 56 through the passage 67 in stem 50, and thence at high velocity through nozzle 66. Assuming that the control chamber 62 is initially full of air as distinguished from liquid, a high-velocity jet of liquid emanates from power nozzle 66 and passes coaxially to and into a receiver port 68 in a receiver element 69 (FIGS. 2 and 4).

The illustrated receiver 69 is generally wheel-shaped, having an outer cylindrical portion which is seated between the upper end of stem 37 and a shoulder at the lower portion of inner wall 41. Suitable seals or O-rings 71 are provided to prevent leakage of fluid along the outer cylindrical surface of the receiver. A plurality of web elements 72, FIGS. 2 and 4, connect the outer portion of the receiver to an axial portion thereof incorporating the upwardly-facing receiver port 68. Each of the webs 72 has formed therethrough a radial passage 73 adapted to transmit fluid from receiver port 68 to an annular groove 74 in the wall means 38.

Groove 74 communicates with a plurality (illustrated as two) of passages or conduits 76 which extend upwardly through the webs 42 and 29 to power chamber 58. Because of the action of power nozzle 66, which directs the high-velocity jet accurately into the receiver port 68, the great majority of liquid passing through control chamber 62 when it is filled with air, and prior to the time that power chamber 58 is filled with liquid, passes through passages 73 and groove 74 to passages 76 and thus to power chamber 58 to rapidly fill the same with liquid. However, after such chamber 58 is filled, which occurs only a few seconds after initiation of flow through fill pipe 13, the great majority of fluid emanating from power nozzle 66 flows through openings 77 (FIG. 4) in the receiver 69 and thus downwardly through spillway 63 into the bottom of the tank.

Check valves in the form of balls 78 (only one of which is shown in the drawings, FIG. 2) are provided at the upper end of each passage or conduit 76. More specifically, the balls 78 seat in chambers 79 formed in webs 29, and are maintained in such chambers by pins 80. The balls 78 do not substantially impede upward flow of liquid through the passages 76 into power chamber 58, but do prevent downflow of liquid from such chamber through passages 76.

An additional or vent passage 81 communicates through poppet wall 47 with the extreme upper end of power chamber 58, and extends therefrom to the upper end of the outlet chamber or annulus 57. Vent 81 is much smaller in diameter than is the port 68, etc., so that despite the presence of vent 81 a very large pressure may be built up in the power chamber 58 due to inflow from power nozzle 66.

When gasoline or other liquid is initially passed through pipe 13 to inlet chamber 56, power chamber 58 fills very rapidly (as described above) and air therein is vented through port or passage 81 to outlet annulus 57. As soon as chamber 58 fills with liquid, a relatively static condition is created whereby the pressure in chamber 58 is only a small amount less than the inlet pressure present in inlet chamber 56, there being very little pressure drop in the various passages since the only flow therethrough is that necessary to make up for drainage through the small-diameter vent passage 81.

The diameter (and area) of the lower surface of poppet wall 47 is caused to be sufficiently greater than the diameter (and area) of flow port 23 that the upward force acting on the poppet 44, as the result of the pressure in chamber 58, overcomes the downward force acting thereon due to the pressure in chamber 56. Therefore, the poppet rapidly moves upwardly to the extreme position permitted by stop 51 and illustrated in the drawings.

It follows that within a few seconds after application of fluid pressure to the inlet chamber 56, the flow therefrom is constricted greatly. Liquid then flows at high velocity from the inlet chamber through annulus 53 in the form of a sheet or cone of liquid. The cone passes downwardly along the upper and peripheral surface of frustoconical poppet wall 47 into contact with the inner surface of flared portion 24 of casing section 16. The sheet of liquid then passes downwardly along such inner surface and along corresponding inner surfaces of elements 17 and 18 until the first deflector means 32 is engaged.

Such first deflector means 32 has an upper surface or ledge portion 83 which is generally frustoconical about the axis of the valve, and which converges inwardly and upwardly (at a small angle to the horizontal). Thus, the liquid passing downwardly along the inner surface of wall 31 is caused to reverse direction. This creates a reduction in velocity so great that the outlet chamber 57 tends to fill with liquid. Such substantial filling of chamber 57 with liquid greatly impedes the rate of flow of liquid downwardly through chamber 57 and into the tank. Thus, both during the early stages of low-flow operation and during later stages thereof, the velocity of the liquid discharging from the lower end of casing section 18 (around stem 37) is caused to be low.

The second deflector means 36 has an upper surface 84 (outer surface of stem 37) which curves downwardly and radially outwardly, the outer end thereof being generally horizontal. Therefore, the liquid flowing downwardly through the discharge annulus 85 (formed between stem 37 and the lower end of casing section 18) engages such surface 84 and therefore is smoothly directed radially outwardly along the bottom of the tank.

The constricting action effected by poppet 44, in combination with the deflector and velocity reducing actions achieved by the deflector means 32 and 36, cause initial filling of tank 11 to occur in a splash-free manner not characterized by substantial vapor formation or by generation of static electricity. It is an important feature of the invention that the vapor and mist necessarily generated in control chamber 62, when the high-velocity jet from the power nozzle impinges on the receiver 69, are trapped and therefore are not introduced into tank 11. More specifically, such vapor and mist generated in control chamber 62 are swept or scavenged downwardly into spillway 63 and thence outwardly into tank 11 at a location beneath the level of the liquid present in or entering such tank. Because the vapor and mist are introduced into the tank below the level of the liquid therein, the amount of vapor and mist present in the tank is greatly reduced.

The stated downward sweeping or scavenging of vapor and mist is effected by aspirated air which enters control chamber 62 through the same path as does liquid from tank 11 when the liquid level therein is sufficiently (safely) high. This path includes a control port 88 and passage 89, the latter communicating through an inlet 90 with control chamber 62. Air is aspirated through port 88 into passage 89 due to the action of the high-velocity jet from nozzle 66. The air then strikes a plug 91 and flows downwardly through a passage portion 92 into ballast chamber 61, which is relatively large in size as shown in FIG. 3. The air from the ballast chamber then flows upwardly through a passage portion 93 to the passage 89 and thus to inlet 90 leading to control chamber 62. The passage 89, etc., extend through a web portion 95 of the central casing section 17.

The inlet 90 to chamber 62, and the adjacent portion of passage 89, are preferably arranged tangentially of the control chamber 62 so that the aspirated air will flow vortically in such chamber and create a low-pressure region along the axis, thus aiding the jet operation. Furthermore, after the control chamber 62 fills with liquid as described below, the liquid in such chamber is caused to flow vortically to enhance the operation of the control chamber 62 in effecting shifting of the poppet 44 to high-flow position.

The control port 88 is located sufficiently far above the lower edge of casing section 18 (which defines the upper limit of the outlet annulus from the loading valve) that high-velocity flow of fluid through the loading valve may occur without danger of generating static electric charges or excessive vapors. When the surface of the gasoline or other liquid introduced into tank 11 reaches the elevation of control port 88, such liquid is drawn in through the control port 88 and communicating passage and chamber means to control chamber 62. Chamber 62 therefore fills with liquid, so that the velocity of the jet emanating from nozzle 66 is very greatly reduced due to the impedance of the liquid to jet flow from the nozzle. The pressure present at receiver inlet 68 then drops drastically, with consequent reduction in the static pressure present in power chamber 58. The pressure reduction is sufficiently great that the upward forces acting against poppet 44 are overcome by the downward forces acting thereon, so that the pressure in inlet chamber 56 operates to force poppet 44 downwardly for the full extent of its travel until the lower poppet edge engages seat 54.

During downward poppet movement, liquid from power chamber 58 vents through passage 81 into annulus 57. Such liquid is prevented from venting through passages 76 due to the fact that the balls 78 are then seated. The venting through passage 81 is relatively slow, due to the small cross-sectional area of such passage, which insures that opening of poppet 44 will occur slowly and will not create undesired surges in the lines leading to fill pipe 13. It will thus be seen that the check valves permit rapid shifting of poppet 44 to its constricting position, as is desired in order to prevent static buildup and vapor formation during the initial stages of the tank-loading operation, but cause a slow shifting of the poppet 44 to fully-open condition as is desired to prevent line surges.

So long as control chamber 62 is maintained filled or substantially filled with liquid, the poppet 44 remains in its lower position (seated on seat 54) causing the annulus 53 to be very large instead of constricted as shown in FIG. 2. Therefore, the flow from inlet chamber 56 through port 23 to annulus 57 and thence out the bottom of the valve becomes very large as is desired for rapid filling of tank 11 with liquid. If, for any reason, the loading valve 14 is lifted until control port 88 is above the surface of the liquid in tank 11, control chamber 62 becomes cleared of liquid (such liquid draining through openings 77, FIG. 4, and into spillway 63). The jet emanating from power nozzle 66 is then unimpeded by liquid, so that the pressure at receiver inlet port 68 builds up to effect flow of liquid through passages 76 to power chamber 58. Thus, and as described above, poppet 44 is shifted upwardly to the illustrated flow-constricting position.

The extremely high-flow conditions which occur when poppet 44 drops to its full-flow position cause an extremely rapid radial outflow of liquid from the bottom of the loading valve. This outflow is so rapid that unless the control port 88 is located a substantial distance above the bottom of the loading valve, as shown in the drawing, the action of the high-velocity liquid emanating from the bottom of the valve will lower the liquid level in the tank 11 (adjacent the valve) sufficiently to cause much foaming and other undesirable effects. It is an important feature of the present apparatus that the storage or reservoir chamber 61 permits the control port 88 to be disposed at an elevation lower than that which would be possible if no such chamber 61 were present.

When the liquid level in tank 11 first reaches the elevation of port 88, such liquid is aspirated into the chamber 61 and thence through inlet 90 into control chamber 62 to fill the same with liquid and thus initiate a a high-flow condition. As soon as such high-flow condition is achieved, the extremely rapidly flowing liquid emanating from the bottom of the valve 14 reduces the liquid level in the tank 11 in the immediate vicinity of valve 14. Control port 88 is then exposed to air, and such air is drawn into reservoir chamber 61. However, before sufficient air can be drawn through inlet 90 into control chamber 62 to cause reshifting of the valve to a low-flow condition, the rapidly flowing liquid entering the tank from the bottom of the valve 14 will have raised the liquid level in the tank to a permanent elevation above that of control port 88. The liquid stored in reservoir or ballast chamber 61 is sufficient to feed chamber 62 during the transition period, and thus delay shifting to a low-flow condition for a time period sufficient to permit filling of the tank 11 to an adequate level, and such filling to an adequate level is in turn adapted to prevent any shifting to low-flow condition.

Accordingly, the control port 88 need not be located at an elevation sufficiently high to insure that the initiation of the high-flow condition will not lower the tank level substantially in the vicinity of the loading valve 14. This is an important feature since it reduces the length of time during which a low-flow condition must be maintained, and therefore reduces the time required to fill the tank with liquid.

It is to be noted that the flows of fluid through the present valve 14 are parallel in nature. The main flow is from inlet chamber 56 through flow port 23, thence through annulus or chamber 57 and out the bottom of the casing 16-18 through the annulus below the lower lip of casing section 18. A second and parallel flow of fluid through the valve is from inlet chamber 56 through passage 67 and power nozzle 66 to control chamber 62, thence through openings 77 (FIG. 4) in receiver 69 to spillway 63, and thence out the lower end of such spillway. A third flow is through control port 88 into communicating passage means 89, etc., to control chamber 62, thence downwardly through openings 77 and spillway 63 out the bottom of the latter. A portion of the second-mentioned flow, that through passage 67 from inlet 56, is diverted by the inlet port 68 of receiver 69 and passes upwardly to power chamber 58, from whence it flows through vent 81 into the outlet chamber 57 and then out the bottom of casing section 18.

Since most of chamber 62 is shown as being below the elevation of control port 88, it might be thought that the chamber 62 would fill with liquid rising through spillway 63, thus causing shifting to high-flow operation before the elevation of port 88 is achieved by the surface of liquid in tank 11. This does not occur, however, since the aspiration of air through port 88 operates to maintain sufficient air in chamber 62 that the requisite pressure will be maintained in receiver port 68. In some cases the control chamber is filled with froth or foam (aerated liquid), but such foam is sufficiently light that the jet action is not impeded excessively. Thus, the low-flow condition continues until after the liquid level reaches port 88 and causes filling of chamber 62 with "solid" liquid, not aerated liquid.

SUMMARY OF OPERATION

Let it first be assumed that the lower end of fill pipe 13 (FIG. 1) does not incorporate any loading valve, and that (as often occurs) the initial inflow of liquid through the pipe 13 into tank 11 is at high velocity. Such high-velocity flow causes very substantial splashing in the empty tank 11, thereby generating dangerous charges of static electricity. The splashing liquid also rapidly fills such tank with a vapor or mist of the volatile liquid entering through the pipe. Accordingly, as the tank is thereafter filled with liquid, the upper surface of the liquid operates as a piston to force the vapor or mist out through the opening 12 in the upper end of tank 11, and into the atmosphere where smog formation occurs.

The present loading valve automatically cures both of the above problems, and with a simple and rugged self-contained unit incorporating only one major moving part, and requiring no springs or diaphragms, in the following manner.

When the gasoline or other liquid is initially passed into inlet chamber 56 through pipe 13, poppet 44 is in the lower position (opposite the one shown in FIG. 2). However, the fluid pressure in chamber 56 creates a rapid flow of liquid through passage 67 and power nozzle 66 to the inlet port 68 of receiver 69, the pressure at receiver 69 then building up quickly so that liquid flows upwardly through passages 76 and past check-valve balls 78 into power chamber 58. The pressure in chamber 58 is sufficient to overcome the inlet pressure at 56, due to the above-stated area differential, so that poppet 44 is shifted upwardly to the constricting position determined by stop nut 51. Such constricting position is adjusted in such manner that the initial flow past the flow-constricting poppet 44 will not be sufficiently great to cause splashing as the liquid enters the tank.

The down-flowing liquid is subject to the above-stated actions of the deflector means 32 and 36, and therefore emanates horizontally out the bottom of the loading valve in a very smooth, nonsplashing manner. Furthermore, until the high-flow condition is initiated, such flow out the bottom of valve 14 is relatively low in velocity.

The vapor and mist generated in control chamber 62 as a result of the passage of the high-velocity liquid jet therethrough are trapped in chamber 62 and swept downwardly (by the aspirated air) through openings 77 (FIG. 4) to the spillway 63, where they enter the bottom of tank 11 beneath the level of the liquid in the tank. Because the lower end of the spillway 63 communicates with the interior of tank 11 at an elevation below that of the outlet from the valve casing 16-18 (such outlet being the annulus below the annular lower edge of casing section 18), even when liquid is initially being introduced into the tank the air and vapor passing out the spillway 63 will be below the level of the liquid emanating from the lower portion of the valve casing. When thus discharged below the liquid level, the mist and vapor are absorbed into the liquid itself and do not penetrate substantially into the portion of tank 11 above the level of the liquid. The air has been found to bubble upwardly from the bottom of the loading valve 14 in a gentle manner and without violent percolation, the bubbles being largely air with only a very small proportion of vapor.

The high-velocity jet from power nozzle 66 causes an aspiration of air through control port 88 and connecting passages, as described in detail heretofore. After the level of the liquid in tank 11 reaches the control port, liquid is drawn into the control chamber 62 to fill the same. The velocity of the jet from power nozzle 66 is thus drastically reduced, which reduces the pressure at receiver 69 and therefore in the power chamber 58, so that the poppet 44 shifts downwardly.

When the poppet 44 is in the lower position (seated on shoulder 54), liquid from pipe 13 may flow very rapidly through the wide-open annulus 53 and out the bottom of the valve into the tank. Such rapidly flowing liquid causes filling of tank 11 in a short period of time, but without any splashing since the lower portion of the valve is then fully submerged to a depth sufficient to insure against splashing.

The value of having the entire device built into one rugged unit at the outlet of fill pipe 13 is emphasized. There is no necessity for any external tubing, long lengths of tubing, small-diameter ports or passages, etc. It is important that the ports and passages be large in diameter in order to insure against clogging thereof due to the presence of any particle in the tank or in the line leading thereto.

The expression "effective area", as employed in the appended claims relative to poppet 44, refers to those poppet areas which tend, when subjected to fluid pressure, to cause shifting of the poppet along stem 50. Because of the fact that flow port 23 is much smaller in diameter than is the poppet, the "effective area" on which the inlet pressure (in chamber 56) acts is much less than that on which the pressure in power chamber 58 acts. The jet of liquid which passes through port 23 strikes the upper poppet surface over an area determined by the diameter of port 23, so that only a low pressure acts on such upper surface at regions outside the port diameter.

For clarity, the appended claims refer to the loading valve in its normal upright position, but this is not to be regarded as a limitation.

The use of such expressions as "flow port" and "inlet chamber" in the appended claims does not denote that the diameter of the port is necessarily smaller than that of the inlet chamber. For example, the interior cylindrical wall of pipe 13, FIG. 1, could extend down to—and have the same diameter as—flow port 23, without substantially affecting the operation of the valve.

I claim:

1. A loading valve for use in loading tanks with liquids, comprising:
  means to define an inlet chamber adapted to receive liquid from a fill pipe,
    said inlet chamber communicating through a flow port with the interior of the tank to be filled with liquid,
    a movable valve element mounted adjacent said flow port
    to control the rate of flow of liquid therethrough,
      said valve element being movable between a constricting position at which the flow of liquid through said flow port and into said tank occurs at a low rate, and a high-flow position at which the flow of liquid through said flow port and into said tank occurs at a high rate,
  jet-forming means communicating with said inlet chamber to receive liquid therefrom,
  a receiver mounted in spaced relationship from said jet-forming means and disposed to receive a jet of liquid emanating therefrom,
    the space between said jet-forming means and said receiver communicating with the interior of said tank and at an elevation above that of the outlet from the loading valve, the relationship being such that said space will not become filled with liquid until after the level of the liquid in said tank is above that of said outlet from the loading valve,
  means responsive to high-velocity travel of said liquid jet from said jet-forming means to said receiver to maintain said valve element in said constricting position,
    said high-velocity travel occurring when said space is relatively empty of liquid, and
  means responsive to low-velocity travel of said liquid jet from said jet-forming means to said receiver to maintain said valve element in said high-flow position,
    said low-velocity travel occurring when said space contains a quantity of liquid sufficient to impede the travel of said jet and thus the buildup of pressure in said receiver.

2. The invention as claimed in claim 1, in which means are provided to define an outlet chamber extending from said flow port to the outlet from the loading valve into the tank, in which said movable valve element is a poppet disposed in said outlet chamber and having an effective surface area substantially larger than that of said flow port, in which said means responsive to high-velocity travel of said liquid jet from said jet-forming means to said receiver includes a power chamber adapted when sufficiently pressurized to shift said poppet toward said flow port, and in which said means responsive to low-velocity travel of said liquid jet from said jet-forming means to said receiver includes means to drain liquid from said power chamber and thereby permit shifting of said poppet away from said flow port to achieve said high-flow position.

3. The invention as claimed in claim 2, in which means are provided to effect direct communication between said power chamber and said receiver, and in which said loading valve does not incorporate any diaphragm or pilot valves.

4. The invention as claimed in claim 3, in which said means to effect direct communication between said power chamber and said receiver includes passage and check valve means to effect flow of liquid from said receiver to said power chamber, but to prevent flow of liquid from said power chamber to said receiver, and in which said means to drain said power chamber comprises a small-diameter flow passage the effective flow area of which is smaller than that of the passage means to effect flow of liquid from said receiver to said power chamber, whereby said poppet will be shifted rapidly toward said flow port when said space is relatively empty of liquid, but will be shifted slowly away from said port when said space contains said sufficient quantity of liquid.

5. The invention as claimed in claim 1, in which means are provided to define an outlet chamber extending from said flow port to the outlet from the loading valve into the tank, in which first deflector means are provided to reduce greatly the rate of flow of liquid through said outlet chamber toward said outlet and to direct said liquid radially inwardly toward the axis of the valve, and in which second deflector means are provided downstream from said first deflector means to direct said liquid radially outwardly and generally horizontally into the bottom of said tank.

6. The invention as claimed in claim 5, in which said first deflector means comprises ledge means consisting of a surface which converges radially inwardly and toward said flow port whereby to substantially reverse the direction of flow of liquid and thereby effect substantial filling of said outlet chamber with liquid in order to reduce the velocity of flow.

7. The invention as claimed in claim 1, in which wall means are provided to substantially enclose said space between said jet-forming means and said receiver, and in which air-inlet means are provided to effect communication between said space and the exterior of the loading valve.

8. The invention as claimed in claim 7, in which said air-inlet means to effect communication between said space and the exterior of the loading valve includes a reservoir chamber adapted to store liquid and thus provide a time delay function.

9. The invention as claimed in claim 7, in which said wall means to enclose said space comprises a surface of revolution about an axis extending between said jet-forming means and the inlet port to said receiver, and in which said means to effect communication between said space and the exterior of the valve includes a passage communicating tangentially with said space whereby the inflowing fluid flows vortically in said space about said axis.

10. The invention as claimed in claim 1, in which means are provided to sweep or scavenge mist and vapor from said space and to discharge said mist and vapor beneath the level of the liquid in said tank, whereby to prevent excessive formation of vapor in said tank due to operation of the jet from said jet-forming means.

11. The invention as claimed in claim 10, in which said sweep means comprises means responsive to the jet action of the jet from said jet-forming means to aspirate air from the tank and draw said air through said space together with vapor generated in said space, and to discharge said air and vapor from the valve at a location normally below the level of the liquid in said tank.

12. A self-contained static-reducing and vapor-reducing loading valve for tank trucks and the like, and which does not require springs or pilot valves, said loading valve comprising:

an elongated valve casing having an inlet at one end thereof
and an outlet at the other end thereof,
said valve casing also having a flow port therein between said inlet and outlet whereby an inlet chamber is defined in said casing on the inlet side of said flow port, and an outlet chamber is defined in said casing on the outlet side of said flow port,
a poppet movably mounted in said outlet chamber for movement generally coaxially of said flow port,
the diameter of said poppet being larger than that of said flow port,
means to define a power chamber on the opposite side of said poppet from said flow port,
said means including at least a portion of said poppet and also including a stationary wall so located that injection of liquid into said power chamber will tend to effect shifting of said poppet toward said flow port,
the effective area of said poppet exposed to said power chamber being substantially greater than the effective area of said poppet exposed to said flow port whereby said poppet will shift toward said flow port when the pressure in said power chamber approaches that present in said inlet chamber,
means to define a control chamber within said casing,
conduit means including a power nozzle to conduct liquid from said inlet chamber and pass the same in the form of a high-velocity jet through said control chamber when the latter is relatively empty of liquid,
receiver means provided at said control chamber and including a receiver port disposed to receive said jet whereby to increase the pressure in said receiver means,
means to conduct liquid from said receiver means to said power chamber to pressurize the latter and thereby effect shifting of said poppet toward said flow port,
control passage means communicating with said control chamber, and also with the exterior of said casing at a point spaced a substantial distance above said outlet from said casing,
whereby air is aspirated through said control passage means and into said control chamber due to the action of said jet, and
stop means to limit the travel of said poppet so that such travel is between a high-flow position and a low-flow position,
said poppet being remote from said flow port when in said high-flow position,
said poppet being relatively adjacent said flow port when in said low-flow position but being spaced from the portion of said valve casing encompassing said flow port whereby flow of liquid through the valve occurs, regardless of the position of said poppet, when substantial liquid pressure is present in said inlet chamber,
said poppet being in said low-flow position when said control chamber is not substantially filled with liquid and said jet from said power nozzle is therefore effective to build up pressure in said receiver means to a level approaching that in said inlet chamber,
said poppet being in said high-flow position when said control chamber is substantially filled with liquid and the velocity of said jet is consequently impeded sufficiently to reduce the pressure in said receiver means and thus in said power chamber until the latter pressure is insufficient to overcome the pressure in said inlet chamber.

13. The invention as claimed in claim 12, in which said control passage means incorporates reservoir means to prevent emptying of said control chamber of liquid despite temporary dropping of the level of the liquid surrounding the loading valve below the elevation of the inlet to said control passage means.

14. The invention as claimed in claim 12, in which said means to conduct liquid from said receiver means to said power chamber includes relatively large-area passage means incorporating check valve means to permit liquid flow from said receiver means to said power chamber, but to prevent liquid flow from said power chamber to said receiver means, and in which small-area drain means are provided to conduct fluid from said power chamber to said outlet chamber.

15. The invention as claimed in claim 12, in which said control chamber is defined by a wall which is a surface of revolution about the axis of said jet, and in which said control passage means communicates with said control chamber generally tangentially thereof whereby fluid flowing into said control chamber from the exterior of the valve will flow generally vortically about said axis.

16. The invention as claimed in claim 12, in which the upper surface of said poppet is so shaped that liquid flowing through said flow port from said inlet chamber will be directed against the interior surface of said valve casing and will pass downwardly along said interior surface, and in which deflector means are provided to impede the flow of said liquid flowing down said interior surface and also to direct such liquid radially inwardly.

17. The invention as claimed in claim 16, in which second deflector means are provided to receive liquid emanating from said outlet in said valve casing and direct such liquid radially outwardly.

18. The invention as claimed in claim 12, in which said receiver means is adapted to transmit air, mist, vapor and liquid downwardly from said control chamber, and in which spillway means are provided to conduct such transmitted fluid to discharge means located below said outlet from said valve casing, whereby such fluid is always discharged below the level of liquid in the chamber being filled or below the level of liquid being introduced into such chamber.

19. The invention as claimed in claim 12, in which said elongated valve casing is formed of first, second and third interconnecting pieces, said first piece defining said inlet chamber, said flow port and a portion of said outlet chamber, said second piece being connected between said first and third pieces and defining a portion of said outlet chamber, said second piece also defining said stationary wall of said power chamber and at least a portion of said control chamber, said third piece defining the remainder of said outlet chamber.

20. The invention as claimed in claim 19, in which a fourth piece is connected to said third piece and includes deflector means to deflect liquid radially outwardly from the discharge from said third piece of said casing.

21. The invention as claimed in claim 20, in which said fourth piece supports a fifth piece between the upper end of said fourth piece and the bottom of said second piece, said fifth piece cooperating with said second piece in defining said control chamber, and in which said fifth and second pieces also cooperate with each other in defining a ballast chamber which is interposed in said control passage means to provide a reservoir action delaying operation of the valve despite temporary dropping in the level of the surrounding liquid below the level of the intake to said control passage means.

22. The invention as claimed in claim 12, in which said conduit means including a power nozzle is a hollow stem mounted axially of said valve casing and serving as a guide for said poppet, the upper end of said stem being in said inlet chamber, said stem having said power nozzle at the lower end thereof and directing fluid axially into said control chamber.

23. The invention as claimed in claim 12, in which means are provided to effect discharge of said aspirated air from said valve casing at a level below that of the surface of the liquid in the tank being loaded.

* * * * *